Jan. 1, 1929.  1,697,055
D. DIAMOND ET AL
SANITARY MILK BOTTLE RACK
Filed Aug. 4, 1927   2 Sheets-Sheet 1
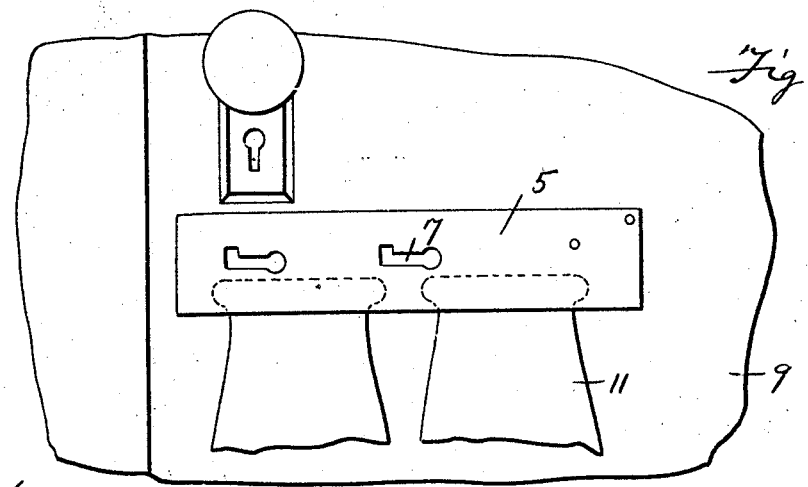
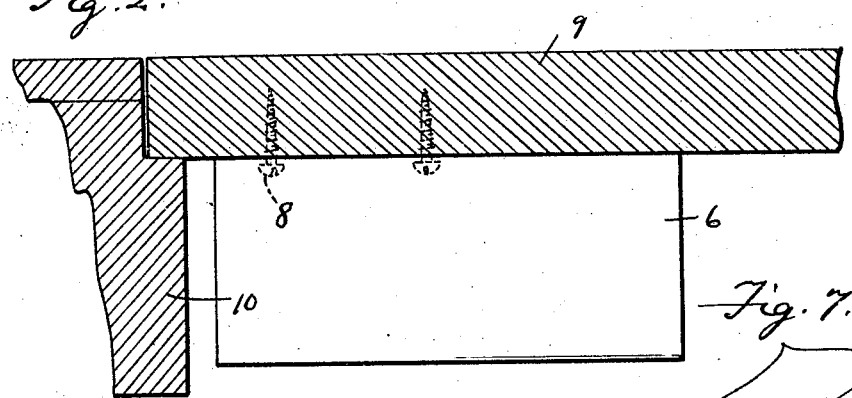
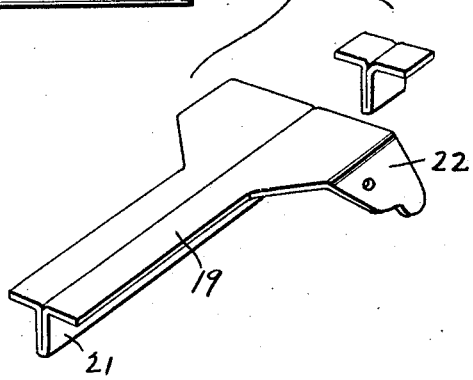
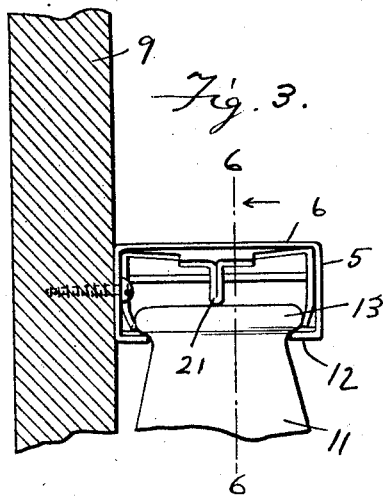
Inventors
David Diamond
Joseph F. Fodor
By *Clarence A. O'Brien*
Attorney Jan. 1, 1929.
D. DIAMOND ET AL
1,697,055
SANITARY MILK BOTTLE RACK
Filed Aug. 4, 1927    2 Sheets-Sheet 2
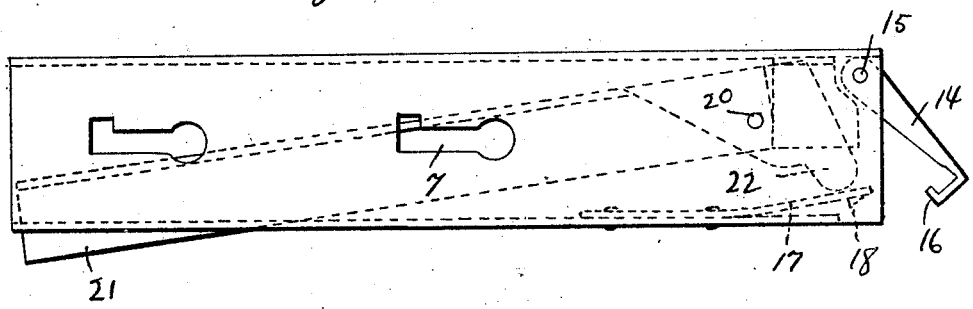
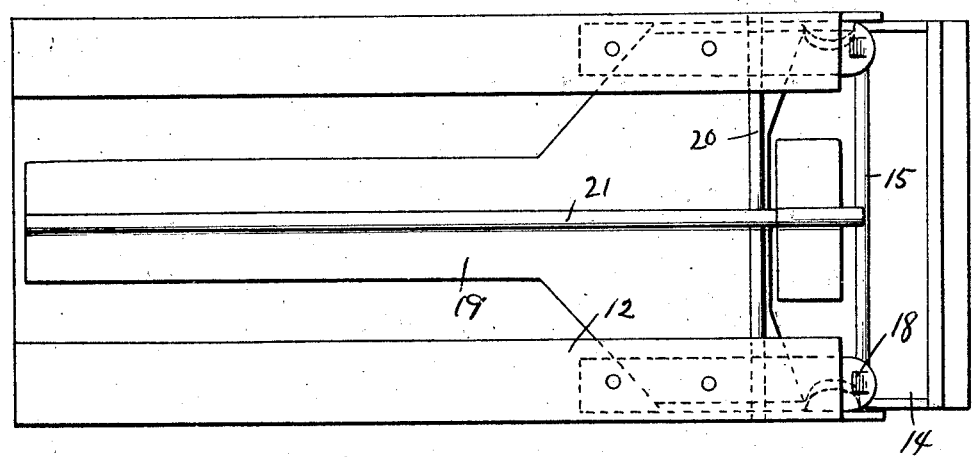
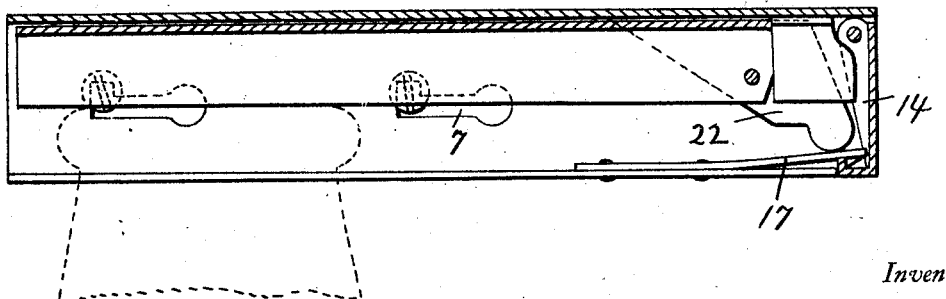
Inventors
David Diamond
Joseph F. Fodor
By Clarence A. O'Brien
Attorney Patented Jan. 1, 1929.

1,697,055

UNITED STATES PATENT OFFICE.

DAVID DIAMOND AND JOSEPH F. FODOR, OF CLEVELAND, OHIO.

SANITARY MILK-BOTTLE RACK.

Application filed August 4, 1927. Serial No. 210,595.

This invention relates to milk bottle racks and has for an object to provide a device of this character adapted to be secured to the outside of a door and arranged to support one or more milk bottles therein in suspended position above the lower edge of the door so as to eliminate the usual practice of setting bottles of milk upon the door sill or floor of a porch during the delivery of the same, thus to provide means for removing the bottles out of reach of animals.

A further object of the invention is to provide a rack of this character embodying a cover for the neck of the bottle while at the same time supporting the same in a suspended position, thus protecting the top of the bottle from rain or dirt or dust.

A still further object is to provide a rack of this character arranged to be secured in position upon a door with one end adjacent the door jamb and with its opposite end provided with a closure device permitting the free insertion of the neck of one or more milk bottles and adapted to be secured in closed position after the bottles have been arranged in the rack and which cannot be opened except upon the removal of the bottles from the rack and arranged to prevent the removal of the bottles therefrom except upon the opening of the door.

A further object is to provide a rack of this character of simple and practical construction, neat and attractive in appearance, efficient and secure in protecting the removal of the bottles in an unauthorized manner, inexpensive to manufacture, and otherwise well adapted for the purposes for which the same is intended.

Other objects and advantages reside in the special construction and combination of the various elements of the invention, reference being had to the accompanying drawings forming a part hereof, wherein:—

Figure 1 is an elevational view showing the rack in position with respect to a door.

Figure 2 is a top plan view thereof.

Figure 3 is a front end view.

Figure 4 is a side elevational view.

Figure 5 is a bottom plan view.

Figure 6 is a longitudinal sectional view taken along a line 6—6 of Figure 3, and, Figure 7 is a perspective view of the rack door locking lever.

Referring now to the accompanying drawings wherein for the purpose of illustration I have disclosed a preferred embodiment of my invention, I provide a substantially rectangular shaped rack which is open at each end and along its lower side and comprising a pair of parallel side members 5 and a top section 6. Each of the side members 5 are provided with a pair of alined slotted openings 7, enlarged at one end whereby to receive the head of a screw 8 adapted to secure the rack in a horizontal position to the outer side of a door 9. In attaching the rack in position to the door, the door is opened and the rack secured with one end overlapping the edge of the door jamb 10, the slots 7 permitting the rack to be moved horizontally to a slight extent to prevent engagement of the rack with the jamb so as to permit the door to be closed. With the door arranged in closed position the screws 8 occupy a position in the slots at the end thereof opposite from the enlarged portion thereof. It will thus be apparent that when the milk bottles 11 are arranged within the rack in a manner hereinafter explained, that the same cannot be removed from the end of the rack adjacent the jamb except upon the opening of the door. As shown in Fig. 1 of the drawing the distance between the jamb and the end of the rack is less than the length of the slots 7 thus preventing the rack from being moved so as to aline the heads of the screws with the enlarged ends of the slot enabling the rack to be removed bodily from the door.

The lower edge of the side members 5 of the rack are provided with inturned flanges 12 adapted to engage the underside of the neck 13 of the milk bottle 11 so as to support the bottles in suspended position from such flanges.

The end of the rack remote from the door jamb 10 is provided with a door 14 swingingly mounted on a pin 15 at its upper end and constituting a closure for such end of the rack. The lower edge of the door 14 is formed into an inwardly extending upturned flange 16, the adjacent ends of the flanges 12 of the sides of the rack having spring latch members 17 attached thereto with catches 18 at the ends thereof arranged for engaging the flange 16 of the door 14 whereby to secure said door in closed position.

When the rack is empty the latch 17 is swung upwardly, thereby permitting the door 14 to be retained in a normal open position. A bellcrank lever 19 is arranged longitudinally within the rack of a formation more clearly illustrated in Figure 7 of the drawing, and pivotally supported near its end adjacent the door 14 upon a transversely arranged rod 20 journaled in the side members 5 of the rack. The under side of the bell-crank lever 19 is formed with a longitudinally extending rib 21 adapted to be engaged by the upper edge of the bottles 11 as the same is inserted in the end of the rack provided with the door, the end of the bell-crank adjacent the door being provided at each side with arms 22 adapted to engage the upper side of the latch members 17 whereby to force said latches downwardly as the bottles are moved inwardly of the rack in a direction toward the door jamb 10 so as to engage the rib 21 and move the same upwardly. With the bottle arranged in position as shown in Figure 6 of the drawing and engaging the rib 17, upon the closing of the door 14 of the rack the same is engaged by the catch formed on the latch member thus preventing the opening of the door to permit the removal of the bottles therefrom until the door 9 has been opened.

It is obvious that the invention is susceptible of various changes in the size, shape and combination of the various elements, without departing from the spirit or scope of the appended claims, and we accordingly claim all such forms of the device to which we are entitled.

We claim:—

1. In a milk bottle rack, a rack member of substantially rectangular formation, open at its under side and at each end thereof, and adapted for attaching in a substantially horizontal position, said rack being adapted to engage the neck of the bottle for supporting the same in suspended position, a door swingingly mounted at one end of the rack member and arranged for independent manual operation for movement into a closed position, a latch engageable with the door for securing the same in closed position, and a bellcrank pivotally mounted above the bottle within the rack member and operable upon the insertion of the bottle therein for engagement with the rack whereby to secure the latch against releasing movement with respect to said door.

2. In combination, a milk bottle rack of substantially rectangular formation and open at its under side and at each end thereof, and having door attaching means for arranging one end of the rack adjacent the jamb of the door to prevent access to within the rack from said end except upon the opening of said door, milk bottle supporting flanges formed along the underside of the rack, a door swingingly mounted at the opposite end of the rack and arranged for independent manual operation for movement into a closed position, a latch member arranged to engage the door for securing the same in closed position, and a bellcrank lever pivotally mounted within the rack having one end engageable with the latch member whereby to control the releasing thereof and its opposite end adapted for actuation by the insertion of a bottle within the rack, said belt rack and latch being arranged to provide an unrestricted passage for the bottles at all times, throughout the length of the rack whenever said rack door is maintained in open position, whereby to enable the insertion of any desired number of bottles in the rack.

In testimony whereof we affix our signatures.

DAVID DIAMOND.
JOSEPH F. FODOR.